(12) United States Patent
Lavrentovich et al.

(10) Patent No.: US 6,411,354 B1
(45) Date of Patent: Jun. 25, 2002

(54) BULK ALIGNMENT OF LYOTROPIC CHROMONIC LIQUID CRYSTALS

(75) Inventors: Oleg D. Lavrentovich, Kent; Tomohiro Ishikawa, Cleveland, both of OH (US)

(73) Assignee: Kent State University, Kent, OH (US)

( * ) Notice: Subject to any disclaimer, the term of this patent is extended or adjusted under 35 U.S.C. 154(b) by 0 days.

(21) Appl. No.: 09/854,171

(22) Filed: May 11, 2001

(51) Int. Cl.[7] ................. G02F 1/1333; G02F 1/1335; G02F 1/1337

(52) U.S. Cl. ................. 349/84; 349/123; 349/96; 349/128; 349/133; 349/191

(58) Field of Search .................. 349/84, 96, 128, 349/123, 133, 191; 430/20; 252/299; 422/82; 435/7

(56) References Cited

U.S. PATENT DOCUMENTS

| | | | |
|---|---|---|---|
| 2,232,539 A | | 2/1941 | Langmuir |
| 5,596,434 A | | 1/1997 | Walba et al. ............... 349/123 |
| 6,034,758 A | * | 3/2000 | Petera |
| 6,171,802 B1 | * | 1/2001 | Woolverton et al. ......... 435/7.1 |
| 6,284,197 B1 | * | 9/2001 | Abbott et al. |

FOREIGN PATENT DOCUMENTS

WO    WO 98/31772    7/1998

OTHER PUBLICATIONS

*Handbook of Liquid Crystals*, (Wiley–VCH, Weinheim, 1998) vol. 2B, Chapter XVIII—Chromonics by Lydon, p. 981.

Sergan et al., *Polarizing–alignment layers for twisted nematic cells*, Liquid Crystals, vol. 27, No. 5, pp. 567–572 (May, 2000).

Lee and Labes, *Lyotropic Cholesteric and Nematic Phases of Disodium Cromoglycate in Magnetic Fields*, Mol. Cryst. Liq. Cryst., vol. 84, pp. 137–157 (1982).

R. K. Iler, *Multilayers Of Colloidal Particles*, Journal Of Colloid And Interface Science, 21, pp. 569–594 (1966).

Decher et al., *Buildup of ultrathin multilayer films by a self–assembly process: II. Consecutively alternating adsorption of anionic and cationic polyelectrolytes on charged surfaces*, Thin Solid Films, 210/211, pp. 831–835 (1992).

Decher et al., *Proof of multilayer structural organization in self–assembled polycation–polyanion molecular films*, Thin Solid Films, 244, pp. 772–777 (1994).

Lui et al., *Two–Dimensional Aggregation of a Long–Chain Thiacarbocyanin Dye Monolayer on Polyanion Subphases*, J. Phys. Chem., 100, pp. 20138–20142 (1996).

Lvov et al., *Assembly of Multicomponent Protein Films by Means of Electrostatic Layer–by–Layer Adsorption*, J. Am. Chem. Soc., 117, pp. 6117–6123 (1995).

Lvov et al., *Molecular film assembly via layer–by–layer adsorption of oppositely charged macromolecules (linear polymer, protein and clay) and concanavalin A and glycogen*, Thin Solid Films, 284–285, 797–801 (1996).

(List continued on next page.)

Primary Examiner—William L. Sikes
Assistant Examiner—Julie Ngo
(74) Attorney, Agent, or Firm—Renner, Kenner, Greive, Bobak, Taylor & Weber

(57) ABSTRACT

A broad class of lyotropic liquid crystals of a non-surfactant nature, the so-called lyotropic chromonic liquid crystals (LCLCs), are alignable in bulk. LCLCs can be aligned in bulk as a uniform liquid crystalline monodomain within a closed cell. The method for bulk alignment of LCLCs is based on a unidirectional treatment of the aligning substrate such as a polymer layer. The feature of controlling the alignment of LCLCs enables one to create practical devices from them. For example, bulk alignment of LCLCs allows one to use them in detection and amplification of ligands.

21 Claims, 3 Drawing Sheets

OTHER PUBLICATIONS

Ariga et al., *Assembling Alternate Dye—Polyion Molecular Films by Electrostatic Layer–by–Layer Adsorption*, J. Am. Chem. Soc., 119, 2224–2231 (1997).

Lvov et al., *Alternate Assembly of Ordered Multilayers of $SiO_2$ and Other Nanoparticles and Polyions*, Langmuir, 13, 6195–6203 (1997).

Lvov et al., *Ultrathin films of charged polysaccharides assembled alternately with liner polyions*, J. Biomater. Sci. Polymer Edn., 9, No. 4, pp. 345–355 (1998).

T.L. Morkved, et al., *Local Control of Microdomain Orientation in Diblock Copolymers Thin Films With Electric Fields*, Science 273, 931 (Aug., 1996).

Schmidt et al., *Shear Orientation of Lyotropic Hexagonal Phases*, J. Phys. Chem. B., 102, pp. 507–513 (1998).

Schneider et al., *Self–Assembled Monolayers and Multilayered Stacks of Lyotropic Chromonic Liquid Crystalline Dyes with In–Plane Orientational Order*, Langmuir, vol. 16, pp. 5227–5230 (May 16, 2000).

Ichimura et al., *Photoimages Formed by Lyotropic Liquid Crystals*, Chemistry Letters 2000 (Sep., 2000), pp. 1022–1023.

* cited by examiner

BULK ALIGNMENT OF LYOTROPIC CHROMONIC LIQUID CRYSTALS

TECHNICAL FIELD

This invention relates to a method by which lyotropic liquid crystals are aligned in a bulk solution as a monodomain liquid crystalline cell.

BACKGROUND ART

A liquid crystal is a state of matter in which molecules exhibit long-range orientational order and wherein long-range positional order is either reduced (one-dimensional positional order in smectic phases) or absent (nematic phases). This intermediate ordering places liquid crystals between crystalline solids (which possess both positional and orientational order) and isotropic fluids (which exhibit no long-range order). Solid crystal or isotropic fluid can be transformed into a liquid crystal by changing temperature (creating a thermotropic liquid crystal) or by using an appropriate diluting solvent to change the concentration of mesomorphic molecules (creating a lyotropic liquid crystal).

Alignment of thermotropic liquid crystals is an active area of current research and development. Usually, the alignment technique is based on a special unidirectional treatment of the plates or substrates that bound the liquid crystalline material. Such techniques are disclosed in U.S. Pat. No. 5,596,434 entitled "Self-Assembled Monolayers For Liquid Crystal Alignment." The '434 patent discloses that the plates are covered with a polymer (such as polyimide) layer which is mechanically rubbed. The direction of rubbing sets the direction of orientation of the thermotropic liquid crystal, i.e., the director, at the substrate, as a result of anisotropic molecular interactions at the interface. The phenomenon of orienting action between the anisotropic (rubbed, for example) substrate and the liquid crystalline alignment is called "anchoring." Alignment by surface anchoring is a standard means of alignment in thermotropic liquid crystalline displays. Surfaces are typically treated with a polymer or a surfactant in order to obtain the desired alignment effects. The methods of alignment are well established for thermotropic liquid crystals but are not necessarily applicable to lyotropic liquid crystals because of the differences in the molecular structure between the two classes of liquid crystals.

Lyotropic liquid crystals are more difficult to align than their thermotropic counterparts. The reason is that most lyotropic liquid crystals are based on amphiphilic materials (surfactants) dissolved in water or oil. Amphiphilic molecules have a polar (hydrophilic) head and a non-polar (hydrophobic) aliphatic tail. When surfactant molecules are in contact with a substrate, their amphiphilic nature generally results in a perpendicular orientation of the molecule with respect to the plane of the substrate. Either the polar head or the hydrophobic tail of the molecule is attracted to the bounding plate, which results in the perpendicular alignment of the molecule with respect to the substrate. Perpendicular alignment means that the preferred orientation is the so-called homeotropic alignment, in which the optical axis is perpendicular to bounding plates.

An exemplary prior art lyotropic liquid crystal cell is designated generally by the numeral 10 in FIG. 1. The cell 10 includes a pair of opposed substrates 12, which are sealed in a well-known manner, that contain surfactant-based lyotropic liquid crystal material designated generally by the numeral 14. The material 14 is formed using water 16 as a solvent for biphilic molecules 18. Each of the liquid crystal molecules 18 possess polar (hydrophilic) parts 20 and apolar (hydrophobic) parts 22. When water 16 is added to biphilic molecules 18, such as the cationic surfactant cetylpiridinium chloride [$C_{21}H_{38}ClN$], a bilayer 26 forms as the hydrophobic regions coalesce to minimize interaction with the water 16 while enhancing the polar component's interaction with water. The concentration and geometry of the specific molecule define the supramolecular order of the liquid crystal. The molecules can aggregate into lamellae as well as disk-like or rod-like micelles, or, generally, aggregates of anisometric shape. Lyotropic liquid crystals are usually visualized as ordered phases formed by the rod-like surfactant molecules 18 (such as $C_{21}H_{38}ClN$ molecules) in water. These anisometric aggregates form a nematic, smectic, columnar phase, of either non-chiral or chiral (cholesteric phase) nature. For example, the $C_{21}H_{38}ClN$ molecules form a stack of lamellae of alternating layers of water and biphilic molecules, thus giving rise to a lamellar smectic A phase. The molecules on average are oriented along the direction schematically shown by a thick vertical arrow 28 called the director n. On average, the surfactant molecules are oriented along the director n. Surfactant molecules and thus the director n orient normally perpendicular to the bounding plates 12 (so-called homeotropic orientation).

There is a special class of lyotropic liquid crystals, called lyotropic chromonic liquid crystals (LCLC). The LCLC family embraces a range of dyes, drugs, nucleic acids, antibiotics, carcinogens, and anti-cancer agents. The molecular and macrostructure of LCLCs are markedly different from that of conventional lyotropic liquid crystals based on amphiphilic rod-like molecules with polar heads and hydrophobic alkyl chain tails, also referred to as surfactants. LCLC molecules are believed to be plank-like rather than rod-like, rigid rather than flexible, aromatic rather than aliphatic. The or $\pi$–$\pi$ interaction of the aromatic cores is the main mechanism of molecular face-to-face stacking according to Lydon [J. Lydon, Chromonics, in: Handbook of Liquid Crystals (Wiley-VCH, Weinheim, 1998) v. 2B, p. 981 and Current Opin. Col. Inter. Sci. 3, 458 (1998)]. Hydrophilic ionic groups at the periphery of the molecules make the material water-soluble. These materials have become a subject of intensive studies lately as it became clear that they can be used as internal polarizing elements in liquid crystal displays, see T. Sergan et al., Liquid Crystals v. 5, pp. 567–572 (2000) and in the amplification and detection of ligands as disclosed in U.S. Pat. No. 6,171,802. These applications are enhanced by a uniform alignment of LCLC materials with the director in the plane of the cell (or slightly tilted).

It has been disclosed by Ichimura et al that inclusion of a non-ionic surfactant into an LCLC such as disodium chromoglycate results in a material that can be aligned by a photoirradiated polymer which incorporates azobenzene groups. But, inclusion of the surfactant material introduces undesirable impurities which can adversely affect the interaction between the liquid crystal and the ligands. Moreover, only photo-sensitive polymers are shown to orient the liquid crystal material without conclusive reasoning as to how this is achieved.

Reliable techniques to align surfactant-free LCLC materials by means of surface anchoring are not known to be available in current literature. The only known art in this regard uses a bulk action of a strong magnetic field applied to the LCLC cell. However, this field-induced alignment is only temporary as the degenerate (no fixed direction of molecular orientation) orientation returns within tens of minutes once the magnetic field is removed.

SUMMARY OF INVENTION

It is thus an aspect of the present invention to provide alignment of lyotropic liquid crystals in bulk solutions.

It is another aspect of the present invention to provide a pair of opposed substrates with alignment layers imparted with orientations in different directions and, in particular, opposite directions.

It is a further aspect of the present invention to provide bulk alignment, as set forth above, wherein the rubbing of the alignment layers generates stable planar alignment of the lyotropic liquid crystal material. Additionally, planar alignment may be obtained by vapor deposition of the alignment material.

It is yet another aspect of the present invention to provide bulk alignment of the liquid crystal material, as set forth above, wherein the liquid crystal material is lyotropic chromonic material.

It is yet another aspect of the present invention to provide bulk alignment of the liquid crystal material, as set forth above, wherein the liquid crystal material is lyotropic cromolyn material.

It is still another aspect of the present invention to provide bulk alignment, as set forth above, wherein the lyotropic liquid crystal material is surfactant-free and mixed with a biospecies which is then disposed between the substrates and observed to determine whether the biospecies distorts alignment of the liquid crystal material.

The foregoing and other objects of the present invention, which shall become apparent as the detailed description proceeds, are achieved by a lyotropic liquid crystal cell, comprising a pair of opposed substrates, an alignment layer on each the substrate, and a sulfactant-free lyotropic liquid crystal material disposed between the substrates and aligned by the alignment layers, wherein alignment of the lyotropic liquid crystal material is stable.

Other aspects of the present invention are attained by a method for aligning lyotropic liquid crystal material, comprising the steps of providing at least one substrate, disposing an alignment material on one substrate, imparting an orientation to the alignment material in a first direction, and disposing a surfactant-free lyotropic liquid crystal material on to the alignment material to orient the lyotropic liquid crystal material corresponding to the first direction, and wherein the orientation remains stable.

Still another object of the present invention is attained by a method for detecting the presence of foreign matter in a lyotropic liquid crystal material, comprising mixing a suspect material which may have foreign matter into a lyotropic liquid crystal material and disposing the mixture between opposed, aligned substrates, wherein the lyotropic liquid crystal material normally exhibits planar alignment, and wherein the presence of foreign matter in the suspect material distorts the planar alignment.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

A variety of approaches are presented herein that result in a uniform alignment of lyotropic chromic liquid crystals (LCLC) with a director that is not perpendicular to the substrate(s). The method, which is called "bulk alignment," allows one to obtain a LCLC monodomain between two specially treated substrates. Such a cell can be used in optical detection and amplification of ligands and other optical devices.

Generally, a way has been found to align LCLCs in the bulk as a uniform monodomain of a liquid crystalline order. "Bulk alignment" allows one to obtain a planar alignment of the LCLC material, such as with a water solution of Cromolyn. To align the LCLC in a planar fashion a polymer alignment layer is disposed on the substrate and either rubbed or otherwise physically modified to impart a uniform orientation to the liquid crystal material. The alignment material is a polymer that yields a homeotropic (perpendicular) alignment of standard thermotropic liquid crystals. When the homeotropic polymer surface is rubbed slightly, the nematic phase of the Cromolyn LCLC aligns in the direction of rubbing. A similar surface rubbing gave a high pretilt angle for a typical thermotropic liquid crystal, 5CB. This fact demonstrates that one is able to align LCLCs with surface treatments that exhibit high pretilt angles for thermotropic liquid crystals. Other alignment techniques are also believed to be viable with LCLC material. For example, angular deposition of SiO could be used as an alignment layer. Or, irradiation of a photosensitive polymer with polarized light could be used. Of course, only photosensitive polymers can be used in this technique which may adversely alter the properties of the liquid crystal for its intended use in this application.

Among the non-surfactant lyotropic liquid crystals are so-called lyotropic chromonic liquid crystals (LCLCs). The LCLC family embraces a range of dyes, drugs, nucleic acids, antibiotics, carcinogens, and anti-cancer agents. For a review see J. Lydon, Chromonics, in: Handbook of Liquid Crystals, Wiley-VCH, Weinheim, vol. 2B, p. 981 (1998), which is incorporated herein by reference. The LCLCs are fundamentally different from the better known surfactant-based lyotropic materials.

Figure 2:
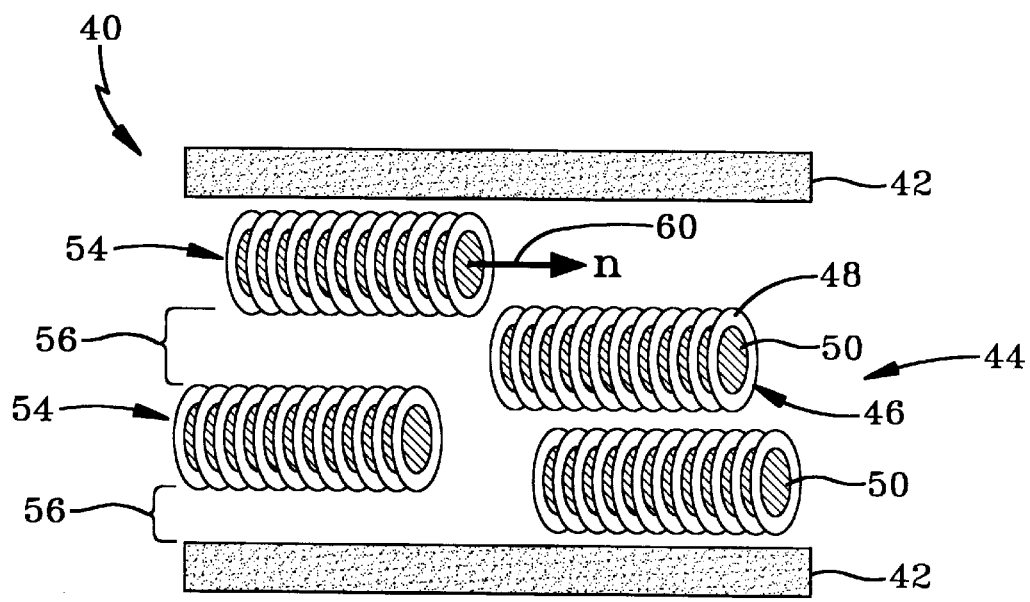
FIG. 2 is a schematic cross-sectional view of a lyotropic chromonic liquid crystal cell according to the present invention.

As best seen in FIG. 2, a lyotropic chromic liquid crystal cell according to the present invention is designated generally by the numeral 40. The cell 40 includes a pair of opposed substrates 42, which are sealed in a well known manner, that contains lyotropic liquid crystal material 44. Qualitatively, the difference from the surfactant type lyotropic materials is that LCLC molecules, designated generally by the numeral 46, are disc-like or plank-like rather than rod-like. The polar hydrophilic parts 48 form the periphery of each molecule, while the central core 50 is relatively hydrophobic. This distinction creates a range of different ordered structures. Individual disc-like molecules may form cylindrical aggregates 54 in water 56. The direction of average molecular orientation is defined by the orientation of the normals to the planes of the plank-like or disc-like molecule. In other words, a director 60 is along the axis of the cylindrical aggregate. It will be appreciated that other geometries of director orientation and of aggregates of chromonic molecules are possible, see the review by Lydon for details. If the cylindrical aggregates shown do not arrange in a well-defined lattice with a long-range positional order, they still can form an ordered phase by aligning the long axes and forming a uniaxial nematic liquid crystalline phase. Chromonic materials may also form other liquid crystalline phases, such as lamellar, hexagonal, M-phase, or N-phase. At an appropriate range of concentration, aggregates form an orientationally-ordered phases. Director 60 shows the direction of orientation. In the example depicted in the figure, the long axes of the aggregates are oriented in a direction parallel to the bounding plates. However, the aggregates do not necessarily align in the same parallel direction. Such an alignment requires a special treatment of the substrates.

Liquid crystalline phases are characterized by orientational order of molecules or their aggregates. In the uniaxial liquid crystal phases such as nematic and smectic A, the average direction of orientation of the molecules or aggregates is described by a unit vector, called the director and often denoted as the letter "n." Generally, the two opposite directions of the director are equivalent, n=−n. In the uniaxial phases, the director is simultaneously the optical axis of the medium. An optically uniaxial liquid crystalline medium is birefringent. A uniaxial birefringent medium is characterized by two optical refractive indices: an ordinary refractive index "$n_o$" for an ordinary wave and an extraordinary refractive index "$n_e$" for an extraordinary wave.

When the liquid crystal is viewed between two crossed polarizers, the appearing texture and the intensity of transmitted light are determined by orientation of the optical axis (director) with respect to the polarizers and other factors, as clarified below.

Figure 3:
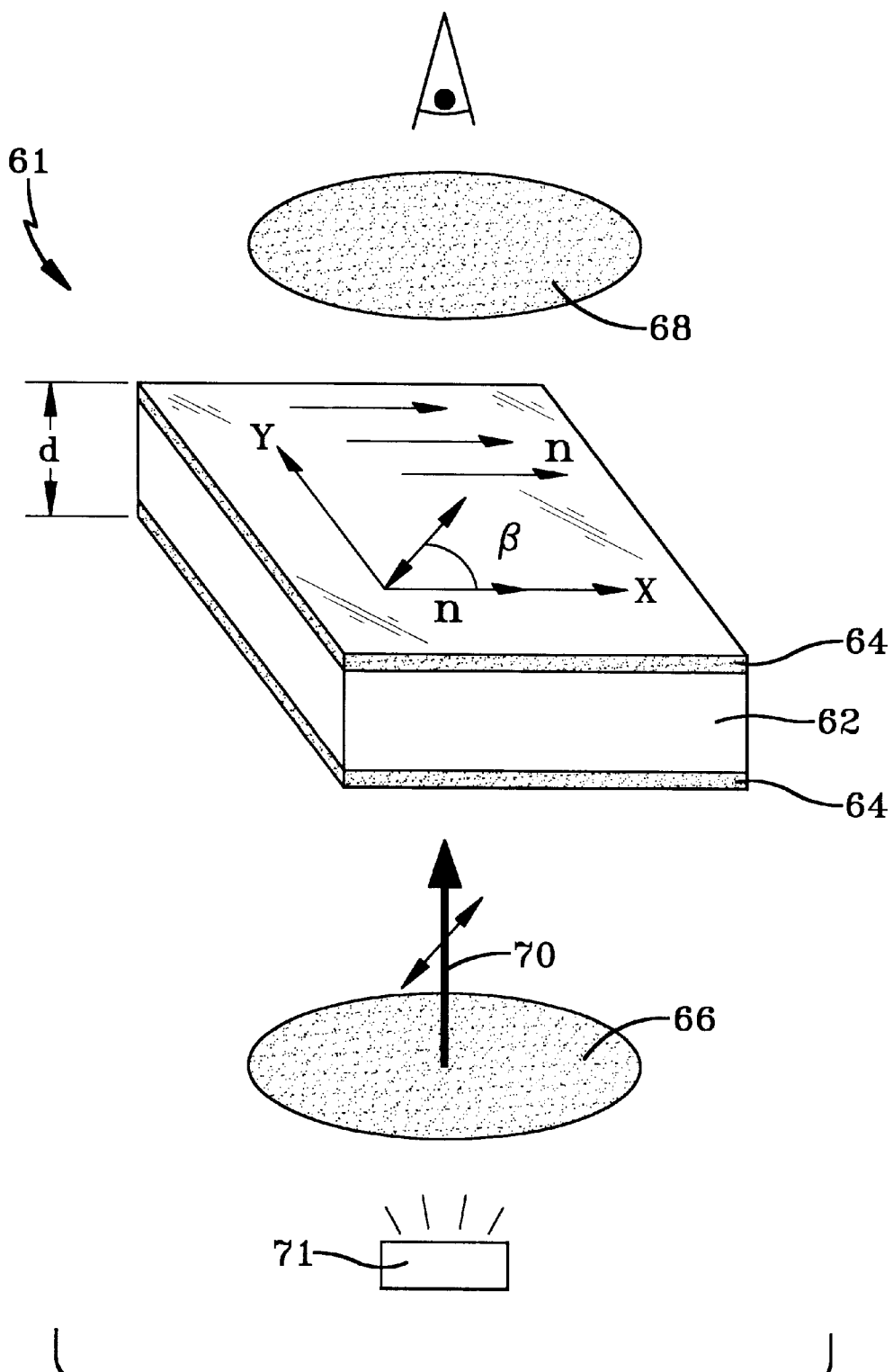
FIG. 3 is a schematic drawing of a lyotropic chromonic liquid crystal cell coupled with a light source and polarizers.

For example, as seen in FIG. 3, a cell, designated generally by the numeral 61, includes a nematic slab 62 sandwiched between two glass plates 64 and placed between two crossed polarizers 66, 68. The director n is in the plane of the slab 62 and depends on the in-plane coordinates (x, y). It is assumed that the director n does not depend on the vertical coordinate z. A light beam 70 from a light source impinges normally on the cell, along the axis z. A polarizer 66 placed between the light source 77 and the slab 62 makes the impinging light linearly polarized. In the nematic slab, the linearly polarized wave of amplitude A and intensity $I_0=A^2$ and frequency ω splits into the ordinary and extraordinary waves with mutually perpendicular polarizations and amplitudes A sin β and A cos β, respectively; where β is the angle between the local n and the polarization of incident light. The vibrations of the electric vectors at the point of entry are in phase. However, the two waves take different times, $n_o d/c$ and $n_e d/c$, respectively, to pass through the slab. Here d is the thickness of the slab, and c is the speed of light in vacuum. At the exit point, the ordinary and extraordinary waves gain a phase shift $$\Delta\varphi = \frac{2\pi d}{\lambda_o}(n_e - n_o),$$

where $\lambda_o$ is the wavelength in vacuum. When two harmonic vibrations $A_1 \cos(\omega t+\phi_1)$ and $A_1 \cos(\omega t+\phi_2)$ of the same frequency occur along the same directions, then the resulting vibration $\overline{A} \cos(\omega t+\overline{\phi})$ has an amplitude defined from $\overline{A}^2 = A_1^2+A_2^2+2A_1A_2 \cos(\phi_1-\phi_2)$. The analyzer 68 thus transforms the pattern of (x, y)—dependent phase difference into the pattern of transmitted light intensity I(x, y)=$\overline{A}_2$. The intensity flight passed through the pair of crossed polarizers and the nematic slab between them follows from Eq. (1) as $$I = I_o \sin^2 2\beta \sin^2 \frac{\pi d}{\lambda_o}(n_e - n_o). \quad \text{(Eq. 1)}$$

The last formula refers to the case when n is perpendicular to the axis z. If n makes an angle θ with the axis z, then (1) becomes $$I = I_o \sin^2 2\beta \sin^2 \frac{\pi d}{\lambda_o}\left(\frac{n_o n_e}{\sqrt{n_e^2\cos^2\theta + n_o^2\sin^2\theta}} - n_o\right) \quad \text{(Eq. 2)}$$

Equations (1) and (2) are fundamental for understanding liquid crystal textures. First, note that the phase shift and thus I depend on $\lambda_o$. As a result, when the sample is illuminated with a whie light, it would show a colorful texture. The interference colors are especially pronounced when $(n_e-n_o)d \sim (\frac{1}{3})\lambda_o$. With typical $(n_e-n_o) \sim 0.2$, $\lambda_o = 500$ nm, the 'colorful' range of thicknesses is $d \sim (\frac{1}{10})\mu m$. Second, the director tilt θ greatly changes the phase shift. When n is parallel to the z-axis (the so-called homeotropic orientation) θ=0, the sample looks dark: only the ordinary wave propagates and I=0. Third, if θ>0 but β=0, ±π/2, . . . , one might still observe dark textures, I=0, even in non-monochromatic light. Viewing a sample from a position opposite the light source, with in-plane director distortions n(x, y), wherever n (or its horizontal projection) is parallel or perpendicular to the polarizer, the propagating mode is either pure extraordinary or pure ordinary and the corresponding region of the texture appears dark. By deliberately aligning a well-oriented liquid crystal sample between two crossed polarizers, one can find an "extinction" position in which the sample is dark. This extinction position corresponds to the director aligned along the polarization direction of the polarizer or the analyzer.

The extinction state occurs for all points of the sample, as long as the director field is not perturbed and uniform. However, if the director field is disturbed and varies from point to point within the slab, then the condition of extinction (meaning I=0 in Equations (1) and (2)) cannot be satisfied everywhere and the resulting intensity of light passing through the polarizer, liquid crystal slab and analyzer will be different from zero.

Figure 4:
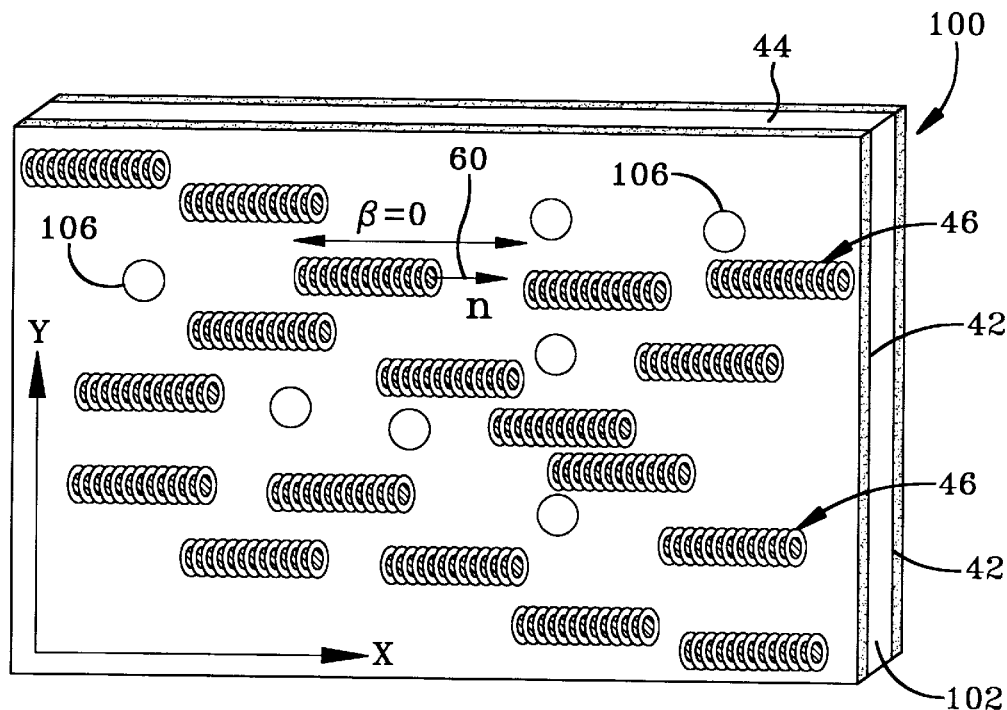
FIG. 4 is a plan view of a lyotropic chromonic liquid crystal cell without a detected material.
Figure 5:
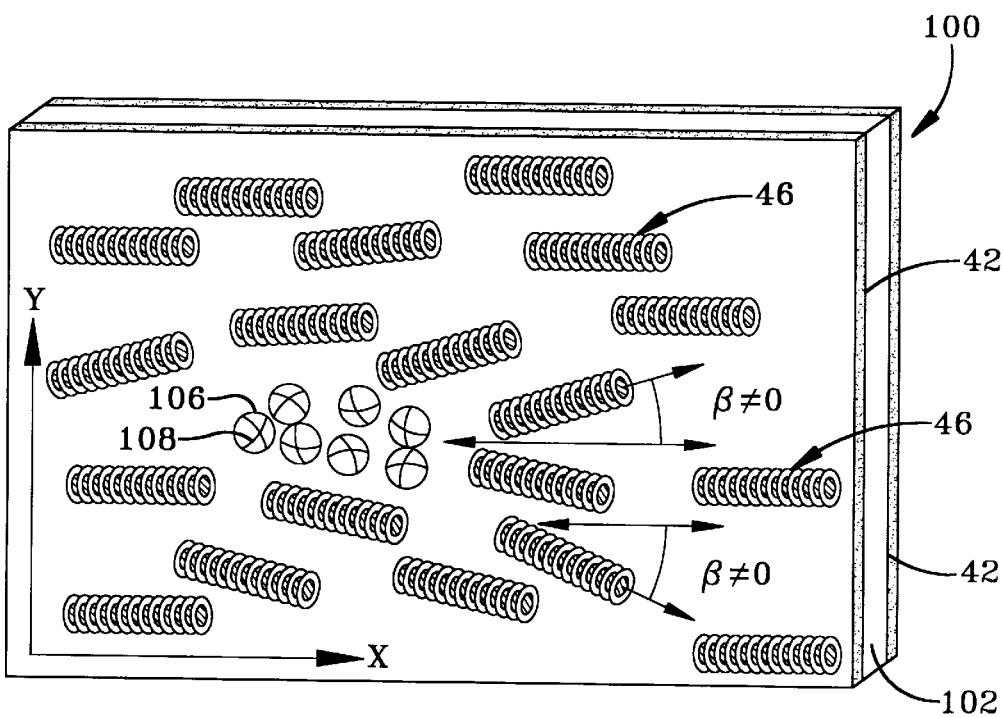
FIG. 5 is a plan view of a lyotropic chromonic liquid crystal cell with a detected material.

FIG. 4 illustrates the importance of a uniform director alignment of the liquid crystal material. An exemplary non-surfactant lyotropic liquid crystal cell used for the detection and amplification of ligands is designated generally by the numeral 100. The cell includes a pair of opposed substrates 42, each of which has disposed thereon an alignment layer 102. Preparation of the alignment layer is discussed in detail below. In any event, a lyotropic chromonic liquid crystal material 46 is oriented in such a way that the director is everywhere parallel to the linear polarization of the incident light; there is no disruption of this alignment by foreign particles or biospecies such as receptors 106 which are schematically represented as circles. The angle between the director and linear polarization is zero, β=0, so that the intensity of any light transmitted through a polarizer, a cell 100, and an analyzer, is zero. However, as seen in FIG. 5, if there are interactions with the foreign particles such as ligands 108—schematically represented by an X—with the receptors 106, and these interactions are sufficiently strong, they can distort the surrounding liquid crystalline matrix. As shown in FIG. 5, the local angle between the director and the linear polarization of light becomes non-zero. In this case, the requirement of extinction is not satisfied and the system becomes locally transparent. This change is then detectable for generation of an appropriate signal. These are the important features allowing one to better use the lyotropic liquid crystals as a detection and amplification system.

The discussion above shows that an efficient detection of ligands is possible when the liquid crystal is aligned uniformly in the liquid crystal cell and when the ligand-receptor pairs disturb this uniform alignment. Therefore, achieving alignment of the liquid crystal significantly enhances the detection process. Uniform alignment may be used not only for detection and amplification of ligands, but also for other applications. For example, the LCLC molecules can adsorb light with certain wavelength and polarization. Therefore, by uniformly aligning the LCLC material, one can obtain a thin polarizing film that can be used as light polarizers in many optical applications.

Figure 1:
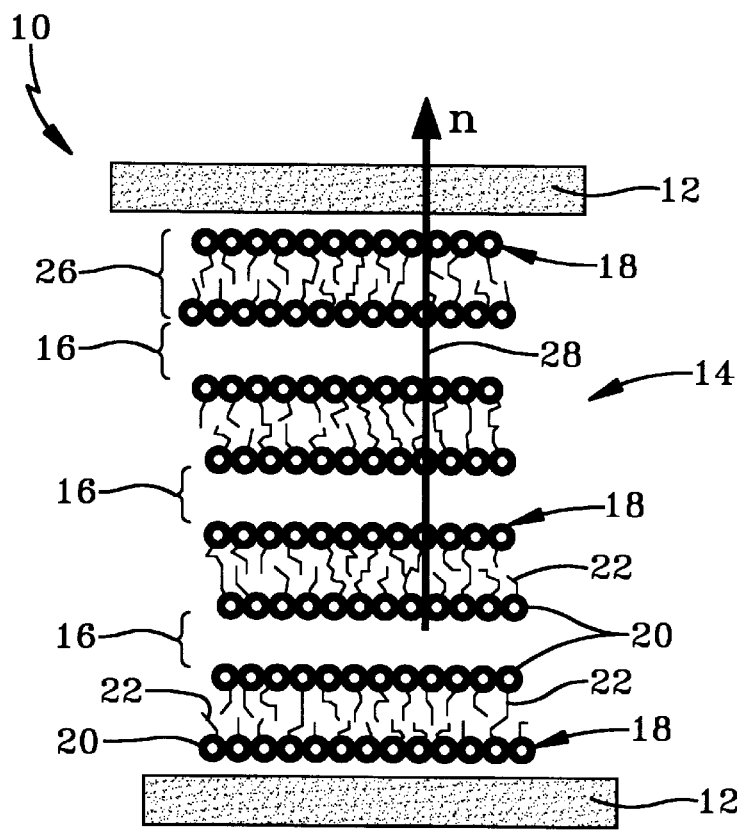
FIG. 1 is a schematic cross-sectional view of a prior art lyotropic liquid crystal cell.

Uniform alignment of lyotropic liquid crystals depends on the nature of the material. The surfactant-based liquid crystals shown in FIG. 1, are usually self-aligned when placed between two parallel glass plates. The alignment in this case is homeotropic, which means that the director is oriented perpendicular to the bounding plates. The homeotropic alignment is explained by the surfactant nature of the molecules: the polar heads tend to attach to the bounding plates, which facilitates orientation of the whole surfactant bilayer parallel to the plates.

Although the surfactant-based liquid crystals are relatively easy to align, in some instances they cannot be used for detection of particular ligands. For example, the surfactant environment might harm the detected biological species. Most biologic receptors possess both hydrophilic and hydrophobic regions and thus can in principle incorporate into lyotropic liquid crystals. However, the quality of such incorporation depends on the particular hydrophobic-hydrophilic balance in the system. Using LCLC materials with hydrophobic-hydrophilic balance different from that of surfactant-based materials as a medium for amplification and detection can greatly enhance the detection and amplification technique described in U.S. Pat. No. 6,171,802. Aligned LCLC can also be used in other applications, for example, as polarizing elements. In this case the relevant LCLC molecules have absorbing properties. The direction of light polarization in LCLC polarizer is controlled by the alignment of the director. Note that a homeotropically aligned uniaxial liquid crystal (such as surfactant-based lyotropic liquid crystal) cannot serve as a polarizing element for normally incident light since all the directions in the plane of the sample are physically equivalent. Aligned LCLCs can also be used as optical phase retarders; in this case, the LCC molecules do not have light absorbing properties; the aligned LCLC sample serves as optically birefringent slab with optical phase retardation controlled by the refractive indices of the material, alignment pattern, cell thickness, and coaction between these and other components of the cell.

As compared to surfactant-based lyotropic liquid crystals, uniform alignment of LCLCs is much more difficult to achieve. When, for example, the substrate attracts the polar part of the LCLC molecule, the axes of the cylindrical aggregates are in the plane of the cell. Since generally all the directions in the plane are equivalent, there is no unique direction to align the director uniformly. To achieve a uniform orientation of the director in the LCLC cell, one should treat the bounding substrate to remove the degeneracy of "in-plane" direction. The relevant techniques are described.

EXAMPLE 1

Bulk Alignment Of The LCLC By The Polymer SE-7511

To make a cell of LCLC comprised of water solutions of Cromolyn ($C_{23}H_{14}O_{11}Na_2$) bulk-oriented, glass substrates are washed in an ultra sonic bath of Alconox detergent and water for 10 minutes at 60° C. The substrates are then removed and dried. SE-7511 (Nissan Chemical, Japan) at a concentration of 3% was coated onto the glass substrates by a spincoater at 1500 rpm. The solvent was dried at 100° C. for 2 minutes prior to baking the substrates at 180° C. for an hour. The thickness of the resultant polymer film is 380 nm. An aluminum block covered with felt rubs the polymer-coated surfaces twice. The rubbing conditions are as follows; the dimension of the block are 3×7.5×0.75 inches, the pile length of felt is ⅛ inch, the pressure is 0.12 lb/in², and the speed 10 in/sec. The cells are then made using the two substrates where the rubbing direction on the top and bottom plates is in substantially opposite directions, which is also referred to as anti-parallel rubbing. The cell thickness was controlled by 20 $\mu$m spacers. The LCLC, comprised of a 12% aqueous solution of Cromolyn in water, filled the cell by capillary effects. Normally, if this cell were filled with the thermotropic liquid crystal 5CB, the pretilt would be 65°. These polymer and rubbing conditions proved to be suitable in aligning the Cromolyn LCLC in a planar fashion, which is appropriate for applications such as the detection and amplification of ligands and fabrication of optical elements such as polarizers, optical retarders and the like.

EXAMPLE 2

Bulk Alignment Of The LCLC By The Polymer SE-1211

To make a cell of LCLC comprised of water solutions of Cromolyn bulk-oriented, glass substrates are washed in an ultra sonic bath of alconox detergent and water for 10 minutes at 60° C. The substrates are then removed and dried. SE-1211 (Nissan Chemical, Japan) at a concentration of 2% was coated onto the glass substrates by a spincoateer at 1500 rpm. The solvent was dried at 100° C. for 2 minutes prior to baking the substrates at 180° C. for an hour. The thickness of the resultant polymer film is 250 nm. An aluminum block covered with felt rubs the polymer-coated surfaces twenty times. The rubbing conditions are as follows; the dimension of the bloc are 3×7.5×0.75 inches, the pile length of felt is ⅛ inch, the pressure is 0.12 lb/in², and the speed 10 in/sec. The cells are then made using the two substrates where the rubbing direction on the top and bottom plates is in opposite directions. The cell thickness was controlled by 20 $\mu$m spacers. The LCLC, comprised of a 12% aqueous solution of Cromolyn in water, filled the cell by capillary effects. Normally, if this cell were filled with the thermotropic liquid crystal 5CB, the pretilt would be 65°. These polymer and rubbing conditions proved to be suitable in aligning the Cromolyn LCLC in a planar fashion, which is appropriate for applications such as the detection and amplification of ligands and fabrication of optical elements such as polarizers, optical retarders and the like.

EXAMPLE 3

Bulk Alignment Of The LCLC By The Polymer SE-610

To make a cell of LCLC comprised of water solutions of Cromolyn bulk-oriented, glass substrates are washed in an ultra sonic bath of Alconox detergent and water for 10 minutes at 60° C. The substrates are then removed and dried. SE-610 (Nisson Chemical, Japan) at a concentration of 4% was coated onto the glass substrates by a spincoater at 1500 rpm. The solvent was dried at 100° C. for 2 minutes prior to baking the substrates at 250° C. for an hour. The thickness of the resultant polymer film is 330 nm. An aluminum block covered with felt rubs the polymer-coated surfaces three times. The rubbing conditions are as follows; the dimension of the block are 3×7.5×0.75 inches, the pile length of felt is ⅛ inch, the pressure is 0.12 lb/in$^2$, and the speed 10 in/sec. The cells are then made using the two substrates where the rubbing direction on the top and bottom plates is in opposite directions. The cell thickness was controlled by 20 µm spacers. The LCLC, comprised of a 12% aqueous solution of Cromolyn in water, filled the cell by capillary effects. Normally, if this cell were filled with the thermotropic liquid crystal 5CB, the pretilt would be 8~10°. These polymer and rubbing conditions proved to be suitable in aligning the Cromolyn LCLC in a planar fashion, which is appropriate for applications such as the detection and amplification of ligands and fabrication of optical elements such as polarizers, optical retarders and the like.

EXAMPLE 4

Bulk Alignment Of The LCLC By SiO Evaporation

To make a cell of LCLC comprised of water solutions of Cromolyn bulk-oriented, glass substrates are washed in an ultra sonic bath of Alconox detergent and water for 10 minutes at 60° C. The substrates are then removed and dried. The glass substrates are then placed in a vacuum chamber with less then 10$^{-6}$ Torr. SiO was evaporated and deposited onto the surface of the glass substrates. The substrates are placed such that the influx of SiO is at a 5° angle as measured from the surface of the glass. The distance between the glass and the evaporation source is about 40". The thickness of the SiO alignment layer is 150 nm. The cells are then made using the two substrates where the SiO evaporation direction on the top and bottom plates is in opposite directions. The cell thickness was controlled by 20 µm spacers. The LCLC, comprised of a 12% aqueous solution of Cromolyn in water, filled the cell by capillary effects. Normally, if this cell were filled with the thermotropic liquid crystal 5CB, the pretilt would be 20°. These SiO coatings proved to be suitable in aligning the Cromolyn LCLC in a planar fashion, which is appropriate for applications such as the detection and amplification of ligands and fabrication of optical elements such as polarizers, optical retarders and the like.

EXAMPLE 5

Bulk Alignment Of The LCLC By The Polymer PI-2555

To make a cell of LCLC comprised of water solutions of Cromolyn bulk-oriented, glass substrates are washed in an ultra sonic bath of Alconox detergent and water for 10 minutes at 60° C. The substrates are then removed and dried. PI-2555 (Microsystems, USA) at a concentration of 6% was coated onto the glass substrates by a spincoater at 3000 rpm. The solvent was dried at 100° C. for 2 minutes prior to baking the substrates at 275° C. for an hour. The thickness of the resultant polymer film is 410 nm. An aluminum block covered with felt rubs the polymer-coated surfaces ten times. The rubbing conditions are as follows; the dimension of the block are 3×7.5×0.75 inches, the pile length of felt is ⅛ inch, the pressure is 0.12 lb/in$^2$, and the speed is 10 in/sec. The cells are then made using the two substrates where the rubbing direction on the top and bottom plates is in opposite directions. The cell thickness was controlled by 20 µm spacers. The LCLC, comprised of a 12% aqueous solution of Cromolyn in water, filled the cell by capillary effects. Normally, if this cell were filled with the thermotropic liquid crystal 5CB, the pretilt would be 2°. These polymer and rubbing conditions proved to be unsuitable in aligning the Cromolyn LCLC. However, these polymer and rubbing conditions proved to be well suited in aligning a different LCLC material, the neutral gray dye (a mixture of Blue 27 ($C_{28}H_{18}C_{12}N_4O_{10}S_2$), Red 14 ($C_{26}H_{18}N_6O_8S_2$), and Violet 20 ($C_{36}H_{22}N_6O_8S_2$) in various proportions) in a planar fashion, which is appropriate for applications in the detection and amplification of ligands and fabrication of optical elements such as polarizers, optical retarders and the like.

The preferred method of detecting ligands will be to premix the lyotropic liquid crystal material with the biospecies, and spacers if needed, and then fill the mixture between the two substrates with alignment properties obtained by anti-parallel rubbing, or one of the other methods discussed above. The cell would then be placed between the polarizer and analyzer, and impinged with light to determine whether the mixed material is uniform or distorted. Of course, variations of the above assembly process could be used. The advantages of such an embodiment are readily apparent inasmuch as planar alignment of LCLC provides a reliable method for detecting and amplifying ligands. The method of making and using the cell are believed to be quite stable and thus well suited for large quantity manufacturing and reliable use in the field.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A lyotropic liquid crystal cell, comprising:
   a pair of opposed substrates;
   an alignment layer on each said substrate; and
   a surfactant-free lyotropic liquid crystal material disposed between said substrates and aligned by said alignment layers, wherein alignment of said lyotropic liquid crystal material is stable.

2. The cell according to claim 1, wherein said alignment layer on one of said substrates is rubbed in a first direction, and wherein said alignment layer on the other of said substrates is rubbed in a second direction different from said first direction.

3. The cell according to claim 2, wherein said second direction is opposite said first direction.

4. The cell according to claim 1, wherein said lyotropic liquid crystal material is planar aligned.

5. The cell according to claim 1, wherein said lyotropic liquid crystal material is chromonic.

6. The cell according to claim 1, wherein said lyotropic liquid crystal material is cromolyn.

7. The cell according to claim 1, further comprising:
   a receptor incorporated into said lyotropic liquid crystal material.

8. The cell according to claim 7, wherein binding of a ligand to said receptor distorts the alignment of said lyotropic liquid crystal material.

9. The cell according to claim 1, wherein said alignment layer on one of said substrates is disposed in a first direction, and wherein said alignment layer on the other of said substrates is disposed in a second direction different from said first direction.

10. The cell according to claim 9, wherein said second direction is opposite said first direction.

11. A method for aligning lyotropic liquid crystal material, comprising:

providing at least one substrate;

disposing an alignment material on said one substrate;

imparting an orientation to said alignment material in a first direction; and disposing a surfactant-free lyotropic liquid crystal material on to said alignment material to orient said lyotropic liquid crystal material corresponding to said first direction, and wherein said orientation remains stable.

12. The method according to claim 11, further comprising:

providing another substrate with an alignment material disposed thereon;

imparting an orientation to said alignment material in a second direction; and positioning said another substrate onto said lyotropic liquid crystal material, wherein alignment of said another substrate compliments the alignment imparted by said at least one substrate.

13. The method according to claim 12, wherein said second direction is substantially opposite said first direction.

14. The method according to claim 13, wherein said lyotropic liquid crystal material is planar aligned.

15. The method according to claim 13, wherein said lyotropic liquid crystal material is chromonic.

16. The method according to claim 13, wherein said lyotropic liquid crystal material is cromolyn.

17. The method according to claim 13, wherein said imparting step is selected from the group consisting of rubbing said alignment material and vapor depositing said alignment material.

18. A method for detecting the presence of foreign matter in a lyotropic liquid crystal material, comprising:

mixing a suspect material which may have foreign matter into a lyotropic liquid crystal material; and disposing said mixture between opposed, aligned substrates, wherein said lyotropic liquid crystal material normally exhibits planar alignment, and wherein the presence of foreign matter in said suspect material distorts said planar alignment.

19. The method according to claim 18, wherein said lyotropic liquid crystal material is chromonic.

20. The method according to claim 18, wherein said lyotropic liquid crystal material is cromolyn.

21. The method according to claim 18, wherein said lyotropic liquid crystal material is surfactant-free.

* * * * *